(12) United States Patent
Mital et al.

(10) Patent No.: US 11,429,654 B2
(45) Date of Patent: Aug. 30, 2022

(54) EXERCISING ARTIFICIAL INTELLIGENCE BY REFINING MODEL OUTPUT

(71) Applicant: Microsoft Technology Licensing, LLC, Redmond, WA (US)

(72) Inventors: Vijay Mital, Kirkland, WA (US); Liang Du, Redmond, WA (US); Ranjith Narayanan, Bellevue, WA (US); Robin Abraham, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 201 days.

(21) Appl. No.: 15/985,415

(22) Filed: May 21, 2018

(65) Prior Publication Data

US 2019/0354632 A1 Nov. 21, 2019

(51) Int. Cl.
*G06F 16/901* (2019.01)
*G06F 16/36* (2019.01)
(Continued)

(52) U.S. Cl.
CPC ............ *G06F 16/36* (2019.01); *G06F 16/901* (2019.01); *G06F 16/904* (2019.01);
(Continued)

(58) Field of Classification Search
None
See application file for complete search history.

(56) References Cited

U.S. PATENT DOCUMENTS

| 6,175,829 B1 * | 1/2001 | Li .................... G06F 16/58 |
| 7,945,891 B2 * | 5/2011 | Mital .................... G06Q 10/10 |
| | | 717/100 |

(Continued)

FOREIGN PATENT DOCUMENTS

| WO | 0213095 A2 | 2/2002 |
| WO | 2016118684 A1 | 7/2016 |

(Continued)

OTHER PUBLICATIONS

"International Search Report and Written Opinion Issued in PCT Application No. PCT/US19/030973", dated Jul. 30, 2019, 12 Pages.

*Primary Examiner* — Ashish Thomas
*Assistant Examiner* — Mellissa M. Ohba
(74) *Attorney, Agent, or Firm* — Workman Nydegger

(57) ABSTRACT

The improved exercise of artificial intelligence. Raw output data is obtained by applying an input data set to an artificial intelligence (AI). Such raw output data is sometimes difficult to interpret. The principles defined herein provide a systematic way to refine the output for a wide variety of AI models. An AI model collection characterization structure is utilized for purpose of refining AI model output so as to be more useful. The characterization structure represents, for each of multiple and perhaps numerous AI models, a refinement of output data that resulted from application of an AI model to input data. Upon obtaining output data from the AI model, the appropriate refinement may then be applied. The refined data may then be semantically indexed to provide a semantic index. The characterization structure may also provide tailored information to allow for intuitive querying against the semantic index.

20 Claims, 6 Drawing Sheets

(51) Int. Cl.
*G06F 16/904* (2019.01)
*G06F 16/9032* (2019.01)
*G06N 20/00* (2019.01)
*H04L 41/16* (2022.01)

(52) U.S. Cl.
CPC ....... *G06F 16/90328* (2019.01); *G06N 20/00* (2019.01); *H04L 41/16* (2013.01); *G10K 2210/3024* (2013.01)

(56) References Cited

U.S. PATENT DOCUMENTS

| | | | |
|---|---|---|---|
| 2007/0203869 A1* | 8/2007 | Ramsey | G06F 40/35 706/52 |
| 2014/0074811 A1* | 3/2014 | Wang | G06F 16/951 707/706 |
| 2014/0282227 A1* | 9/2014 | Nixon | G06F 9/44505 715/786 |
| 2016/0171388 A1 | 6/2016 | Sanchez | |
| 2017/0213155 A1* | 7/2017 | Hammond | H04L 67/42 |
| 2018/0293517 A1* | 10/2018 | Browne | G06Q 10/00 |
| 2019/0354599 A1* | 11/2019 | Mital | G06F 3/04817 |
| 2019/0354633 A1* | 11/2019 | Mital | G06F 16/904 |
| 2019/0354872 A1* | 11/2019 | Mital | G06F 16/2228 |
| 2020/0159868 A1* | 5/2020 | Du | G06F 16/90328 |

FOREIGN PATENT DOCUMENTS

| | | |
|---|---|---|
| WO | 2016183229 A1 | 11/2016 |
| WO | 2017132590 A1 | 8/2017 |

\* cited by examiner

EXERCISING ARTIFICIAL INTELLIGENCE BY REFINING MODEL OUTPUT

BACKGROUND

Computing systems and associated networks have greatly revolutionized our world. Computing systems are now able to engage in various levels of artificial intelligence. Artificial intelligence is a process in which a non-living entity (such as system(s), device(s), or combinations thereof) receives and interprets data to add structure to at least portions of the data.

Artificial intelligence may classify the data it receives. As a relatively intuitive example, an "image example" and a "video example" will often be referred to in which the data input to the artificial intelligence is an image or video, respectively. In the image example, artificial intelligence may take raw image data, determine what are objects represented within the image, identify the object, and perhaps determine properties of those objects. For instance, the artificial intelligence may determine the object's position, orientation, shape, size, and so forth. The artificial intelligence may also determine the object's relationship with other objects such as relative position, and/or organize objects having similarly characteristics. The artificial intelligence may also output confidence levels regarding its determinations. In the video example, the artificial intelligence may also make predictions, such as whether two objects will collide, again perhaps with confidence levels regarding those predictions. The artificial intelligence may also estimate where the objects have been.

Technology has not yet reached a point of generalized intelligence, in which any data may be interpreted in any fashion. However, AI models are used that are tailored to making particular kinds of determinations based on particular kinds of data. Some AI models may be very specific in function, such as determining from X-ray data, whether a weld will fracture. Some AI models may be more general, such as identifying objects within an image. There are a number of tools conventionally available for developing new AI models. At present, there are an enormous number of conventional AI models available, each tailored for purposes of varying specificity, and each being of different quality. Furthermore, the number of available AI models is growing very fast.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to the improved exercise of artificial intelligence. Raw output data is obtained by applying an input data set to an artificial intelligence (AI) model. Such raw output data is sometimes difficult to interpret. For instance, an AI model that is tailored towards video recognition might recognize a list of objects, relationships, confidence levels, and so forth, through time. Some information (like the presence of a pen) might not have any relevance at all. In fact, the raw output might include voluminous data of no or lesser relevance. The principles defined herein provide a systematic way to refine the output from a wide variety of AI models.

An artificial intelligence (AI) model collection characterization structure is utilized for purpose of refining AI model output so as to be more useful. The characterization structure represents, for each of multiple and perhaps numerous AI models, a refinement of output data that resulted from application of the input data set to the AI model. The refinement may involve removal, transformation, or prioritizing the raw output data. For instance, the refinement may involve filtering out some of the AI model output. The refinement may involve truncating, converting, combining, and/or otherwise transforming portions of the AI model output. The refinement may involve prioritizing portions of the output by perhaps ordering or ranking the output, tagging portions of the AI model output, and so forth. There may be a different refinement specified for each AI model or model type. There may even be a different refinement specified for each model/data combination including an AI model or model type with an associated input data set or input data set type. Upon obtaining output data from the AI model, the appropriate refinement may then be applied. The refinement may bring forth, for instance, what a typical user would find most relevant from a given AI model applied on given data. The actually performed refinement may be augmented or modified by hints specific to an AI model and/or by learned data.

In some embodiments, the refined data may then be semantically indexed to provide a semantic index that may then be queried upon by a user, or that may be used to suggest queries to a user. The characterization structure might also include a set of one or more operators and/or terms that a query engine may use to query against the semantic index, or that may be included within the suggested queries presented to the user. By providing those operators and/or terms to the query engine, the user may more effectively use that query engine to extract desired information from the semantic index.

The characterization structure might also include a set of one or more visualizations that a visualization engine may use to visualize to a user responses to queries against the semantic index. Such visualizations may be those that for the given semantic index, most effectively and intuitively represent the output of a query to a user. Thus, the characterization structure may also provide mechanisms to effectively interface with a semantic index generated from the refined output of the AI model. The characterization structure may be easily expanded as new AI model and/or data set types become available.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
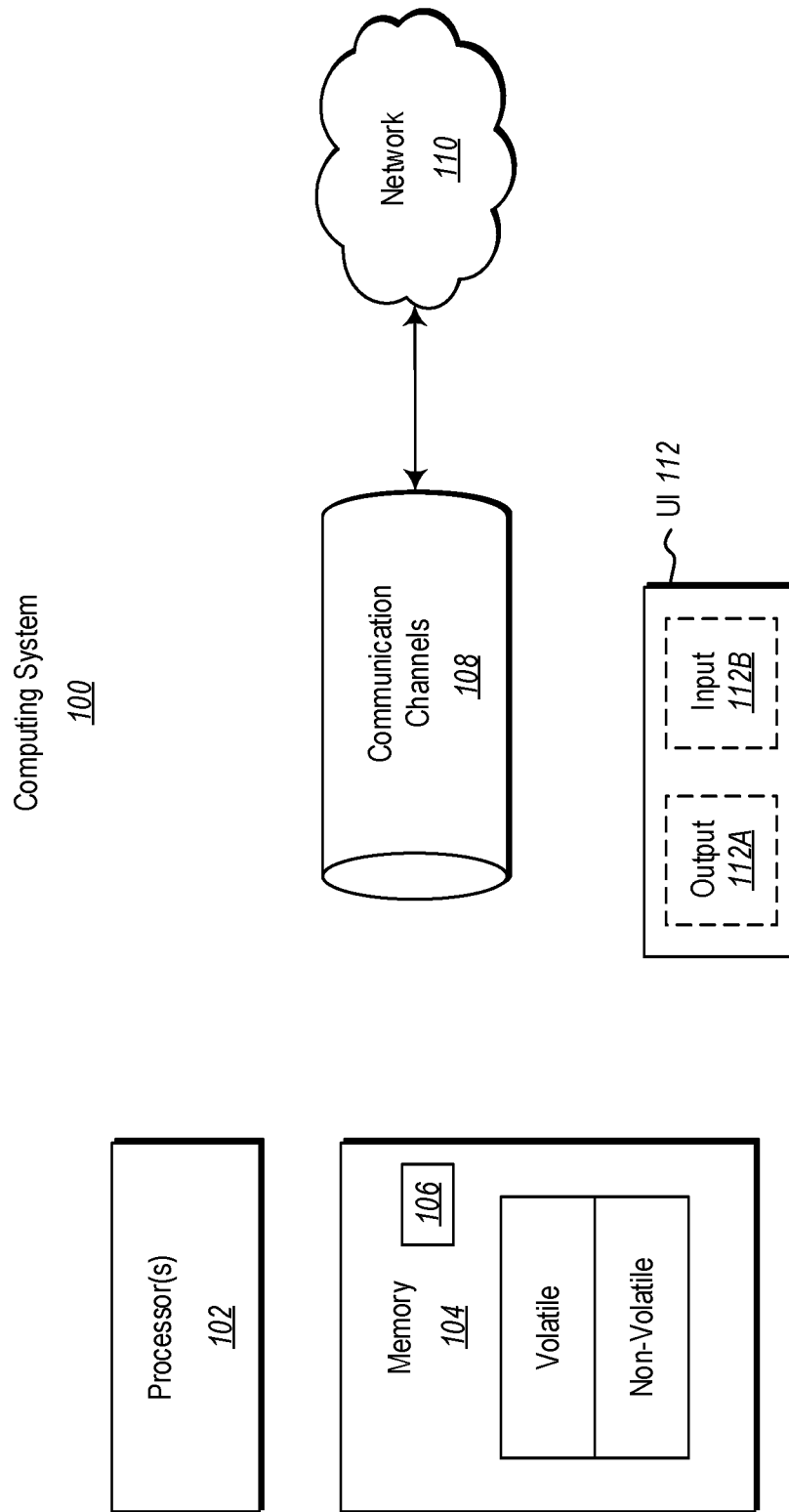
FIG. 1 illustrates an example computer system in which the principles described herein may be employed.

At least some embodiments described herein relate to the improved exercise of artificial intelligence. Raw output data is obtained by applying an input data set to an artificial intelligence (AI) model. Such raw output data is sometimes difficult to interpret. For instance, an AI model that is tailored towards video recognition might recognize a list of objects, relationships, confidence levels, and so forth, through time. Some information (like the presence of a pen) might not have any relevance at all. In fact, the raw output might include voluminous data of no or lesser relevance. The principles defined herein provide a systematic way to refine the output from a wide variety of AI models.

An artificial intelligence (AI) model collection characterization structure is utilized for purpose of refining AI model output so as to be more useful. The characterization structure represents, for each of multiple and perhaps numerous AI models, a refinement of output data that resulted from application of the input data set to the AI model. The refinement may involve removal, transformation, or prioritizing the raw output data. For instance, the refinement may involve filtering out some of the AI model output. The refinement may involve truncating, converting, combining, and/or otherwise transforming portions of the AI model output. The refinement may involve prioritizing portions of the output by perhaps ordering or ranking the output, tagging portions of the AI model output, and so forth. There may be a different refinement specified for each AI model or model type. There may even be a different refinement specified for each model/data combination including an AI model or model type with an associated input data set or input data set type. Upon obtaining output data from the AI model, the appropriate refinement may then be applied. The refinement may bring forth, for instance, what a typical user would find most relevant from a given AI model applied on given data. The actually performed refinement may be augmented or modified by hints specific to an AI model and/or by learned data.

In some embodiments, the refined data may then be semantically indexed to provide a semantic index that may then be queried upon by a user, or that may be used to suggest queries to a user. The characterization structure might also include a set of one or more operators and/or terms that a query engine may use to query against the semantic index, or that may be included within the suggested queries presented to the user. By providing those operators and/or terms to the query engine, the user may more effectively use that query engine to extract desired information from the semantic index.

The characterization structure might also include a set of one or more visualizations that a visualization engine may use to visualize to a user responses to queries against the semantic index. Such visualizations may be those that for the given semantic index, most effectively and intuitively represent the output of a query to a user. Thus, the characterization structure may also provide mechanisms to effectively interface with a semantic index generated from the refined output of the AI model. The characterization structure may be easily expanded as new AI model and/or data set types become available.

Because the principles described herein operate in the context of a computing system, a computing system will be described with respect to FIG. 1. Then, the principles of exercising artificial intelligent will be described with respect to FIGS. 2 through 6.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses, watches, bands, and so forth). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the term "component" or "vertex" may also be used. As used in this description and in the case, this term (regardless of whether the term is modified with one or more modifiers) is also intended to be synonymous with the term "executable component" or be specific types of such an "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms, virtual reality, and so forth. Examples of input mechanisms 112B might include, for instance, microphones, touchscreens, holograms, virtual reality, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or components and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface component (e.g., a "NIC"), and then eventually transferred to computing system RAM and/or to less volatile storage media at a computing system. Thus, it should be understood that readable media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses or watches) and the like. The invention may also be practiced in distributed system environments where local and remote computing systems, which are linked (either by hardwired data links, wireless data links, or by a combination of hardwired and wireless data links) through a network, both perform tasks. In a distributed system environment, program components may be located in both local and remote memory storage devices.

Those skilled in the art will also appreciate that the invention may be practiced in a cloud computing environment, which is supported by one or more datacenters or portions thereof. Cloud computing environments may be distributed, although this is not required. When distributed, cloud computing environments may be distributed internationally within an organization and/or have components possessed across multiple organizations.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand, self-service, broad network access, resource pooling, rapid elasticity, measured service, and so forth. A cloud computing model may also come in the form of various application service models such as, for example, Software as a service ("SaaS"), Platform as a service ("PaaS"), and Infrastructure as a service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Figure 2:
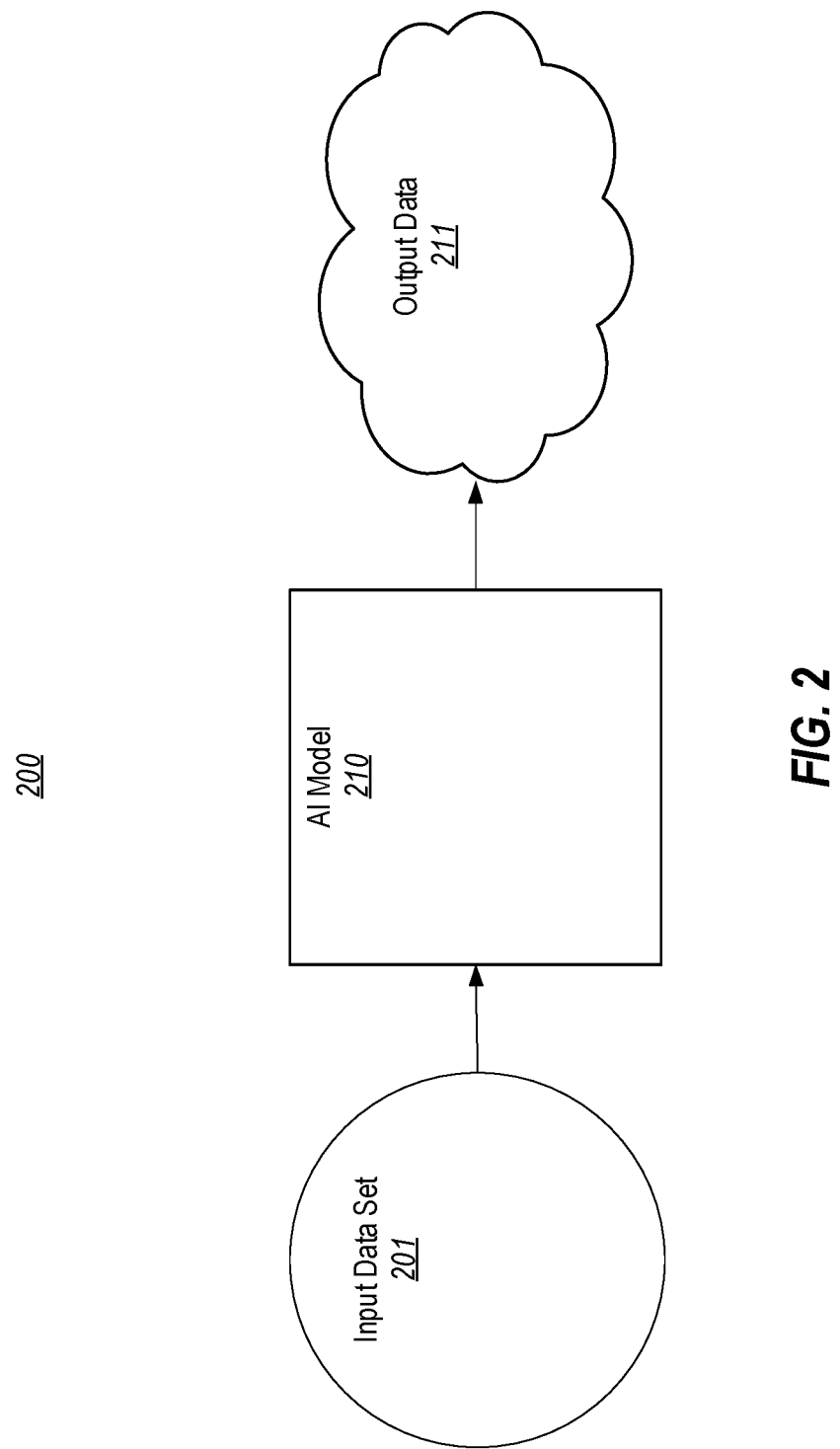
FIG. 2 illustrates an environment in which an input data set is applied to an AI model to generate output data.

FIG. 2 illustrates an environment 200 in which an input data set 201 is applied to an AI model 210 to generate output data 211. An example of an AI model is a machine learning model in which the AI model learns by experiencing. Another example of an AI model is a rules-based model in which the AI model does not learn per-se, but responds to rules and parameters.

The output data 211 is represented as a cloud to represent that the AI model 210 may generate a large volume of data that is difficult to sift through to find relevant information. For instance, an AI model that is tailored towards video recognition might recognize a list of objects, relationships, confidence levels, and so forth, through time. Some information (like the presence of a pen) might not have any relevance at all. In fact, the raw output might include voluminous data of no or lesser relevance. The principles defined herein provide a systematic way to refine the output from a wide variety of AI models. This is critical as this will help with the interpretation data output from a larger variety of the enumerable and fast-growing number of AI models. Thus, the efficacy of AI models is improved.

Figure 3:
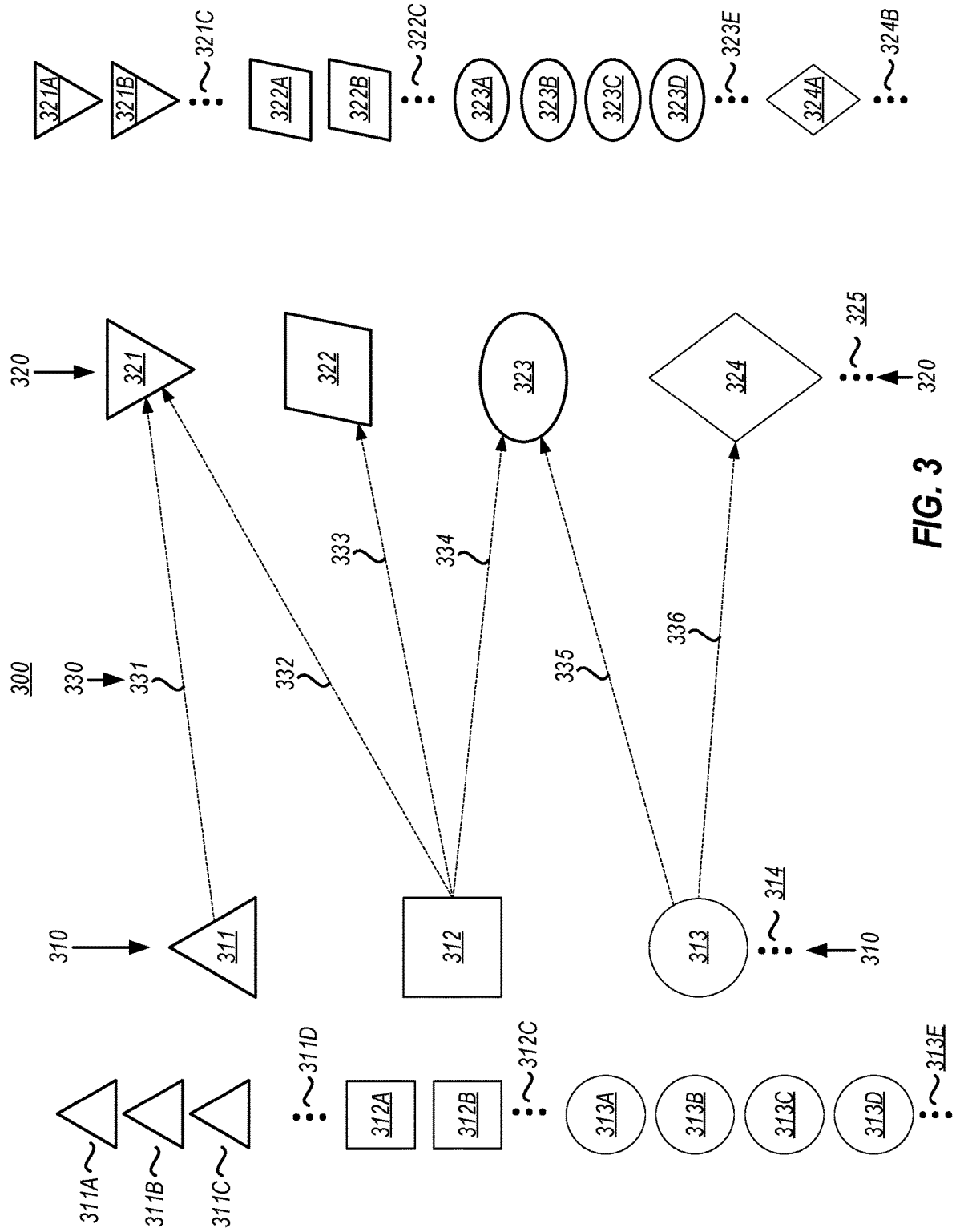
FIG. 3 illustrates an environment that illustrates multiple input data set types and multiple AI model types.

FIG. 3 illustrates an environment 300 that illustrates multiple input data set types 310 and multiple AI model types 320. In the illustrated embodiment, there are three input data set types shown including input data set types 311, 312 and 313. However, the ellipsis 314 represents that there may be any number (and perhaps an enumerable and fast-growing number) of input data set types available for use within the environment 300. Also, the AI model types 320 are shown including four AI model types 321, 322, 323 and 324. However, the ellipsis 325 represents that there may be any number (and perhaps an enumerable and fast-growing number) of AI model types available for use within the environment 300.

Within each input data set type 310, there may be one or more input data sets or input data set subtypes that are available. For instance, within the first input data set type 311, there are a number of input data sets 311A, 311B and 311C. The ellipsis 311D represents that there may be any number of input data sets of the first input data set type 311. Any of the input data sets 311A, 311B or 311C may instead be an input data set subtype representing a more specific type of the input data set type 311. Thus, the input data set type 311 may more generally be the root node in a conceptual hierarchy of input data set types, where the leaf nodes in the hierarchy may contain one or more input data sets. The same thing may be said for any of the input data set types 320.

Throughout the figures, an input data set type is represented with a larger shape, whereas an input data set (or input data set subtype) of that input data set type is represented by a smaller form of that same shape. For instance, the input data set type 311 is represented as a larger upward-pointed triangle, and the input data sets 311A, 311B and 311C of that type 311 are represented by smaller upward-pointed triangle.

Within the second input data set type 312 (represented as a larger square) there are also a number of input data sets 312A and 312B or input data set subtypes (represented as a smaller square). Within the third input data set type 313 (represented as a larger circle) there are also a number of input data sets 313A through 313D or input data set subtypes (represented as a smaller circle). The ellipses 311D, 312C and 313E represent that there may be any number of input data sets or input data set subtypes for any given input data set type.

Turning now to the AI model types 320, within each AI model type, there may be one or more AI models or AI model subtypes that are available. For instance, within the first AI model type 321, there are a number of AI models 321A and 321B. The ellipsis 321C represents that there may be any number of AI models of the first AI model type 321. Any of the AI models 321A and 321B may instead be an AI model subtype representing a more specific type of the AI model type 321. Thus, the AI model type 321 may more generally be the root node in a conceptual hierarchy of AI model types, where the leaf nodes in the hierarchy may contain one or more AI models. The same thing may be said for any of the AI model types 320.

Again, throughout the figures, an AI model type is represented with a larger shape, whereas an AI model (or AI model subtype) of that AI model type is represented by a smaller form of that same shape. For instance, the AI model type 321 is represented as a larger downward-pointed triangle, and the AI models 321A and 321B are represented by smaller downward-pointed triangle.

Within the second AI model type 322 (represented as a parallelogram) there are also a number of AI model models 322A and 322B or AI model subtypes (represented as a smaller parallelogram). Within the third AI model type 323 (represented as an oval) there are also a number of AI models 323A through 323D or AI model subtypes (represented as a smaller oval). Within the fourth AI model type 324 (represented as a rhombus) there is an AI model 324A or AI model subtypes (represented as a smaller rhombus). The ellipses 321C, 322C, 323E and 324B represent that there may be any number of AI models or AI model subtypes for any given AI model type.

The broad point is that there exists an environment 300 in which there are a larger number of available input data sets, and a larger number of AI models. The input data sets may be classified by type or subtype. Furthermore, the AI models may be classified by type or subtype. Thus, the hierarchy of input data set types is merely conceptual, as is the hierarchy of AI models. The environment 300 may be, for instance, a global environment, such as the Internet. However, the environment 300 may also be any environment in which a multiple AI models are available to apply to input data sets.

The arrows 330 represent that for any given input data set type, input data sets of that input data set type may be applied to AI models of an AI model type. In this example, input data sets of the input data set type 311 may be applied to AI models of the AI model type 321 (as represented by arrow 331). Alternatively or in addition, input data sets of the input data set type 312 may be applied to AI models of the AI model type 321 (as represented by arrow 332). Input data sets of the input data set type 312 may also be applied to AI models of the AI model type 322 (as represented by arrow 333), and to AI models of the AI model type 323 (as represented by arrow 334). Input data sets of the input data set type 313 may be applied to AI models of the AI model type 323 (as represented by arrow 335), and to AI models of the AI model type 324 (as represented by arrow 336).

More generally, the arrows 330 represents operational combinations of input data set types and AI model types. At a more refined granularity, there may also be operational combinations of input data sets and AI model types, where operational combinations are available per input data set type for each of the AI model types. Similarly, there may also be operational combinations of input data set types and specific AI models. At the most refined granularity of combinations, there may be operational combinations of input data sets and AI models. Generally stated, within the environment 300, there are operational combinations of (on the one hand) input data sets, input data set subtypes, and/or input data set types, and (on the other hand) AI models, AI model subtypes, and/or AI model types. Such operational combinations may also be referred to generally hereinafter as "data/model combinations".

Figure 4:
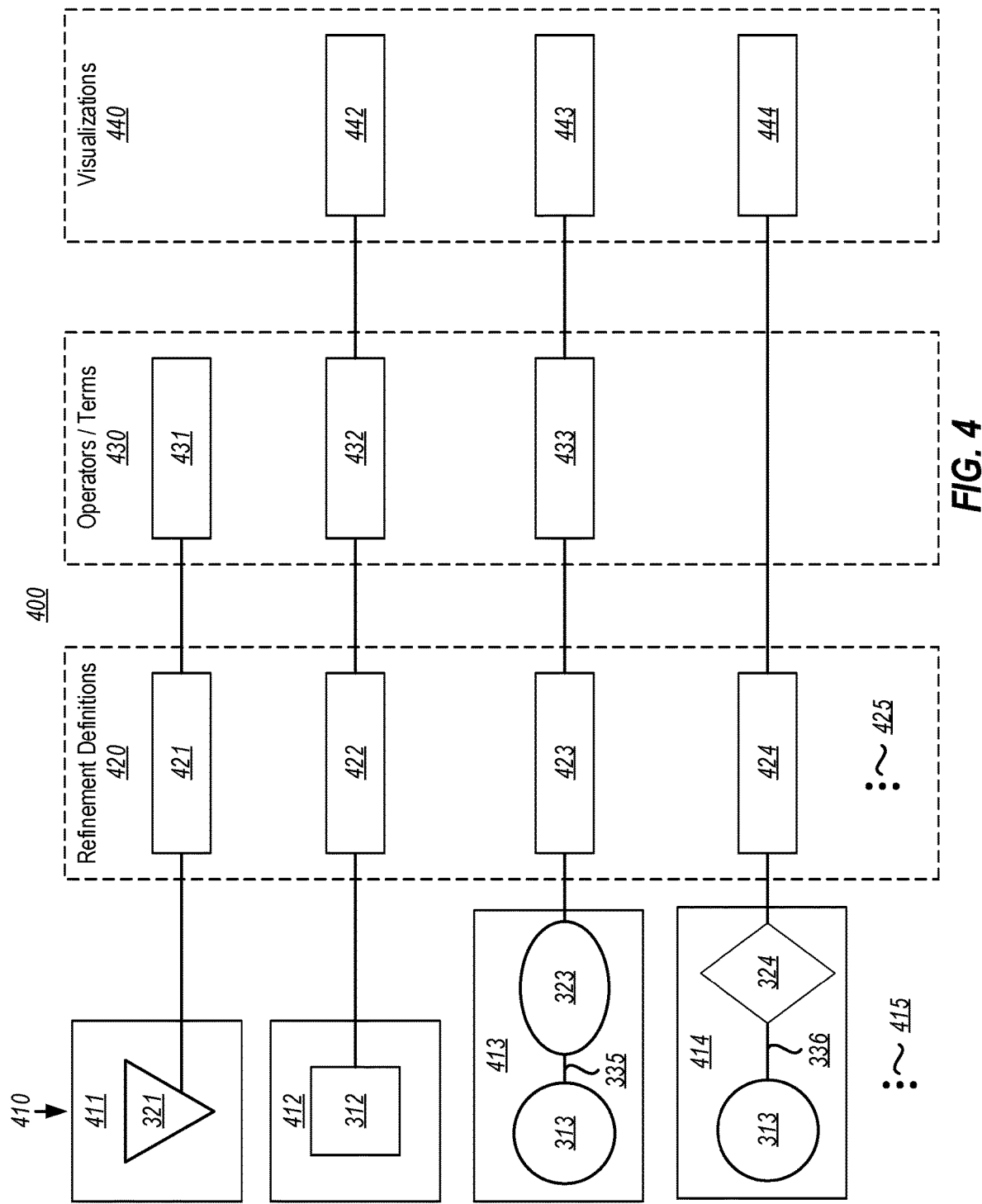
FIG. 4 illustrates an artificial intelligence (AI) model collection characterization structure that may be used to refine raw output data resulting from input data set(s) applied to an AI model, in accordance with the principles described herein.

FIG. 4 illustrates an artificial intelligence (AI) model collection characterization structure 400 (also referred to hereinafter as a "characterization structure") that may be used to refine raw output data resulting from input data set(s) applied to an AI model. For instance, referring also to FIG. 2, the characterization structure 400 may be used to refine the output data 211 resulting from the application of the input data set 201 to the AI model 210.

The characterization structure 400 represents, for each of multiple AI models, a refinement of results of an input data set applied to an AI model. This may performed by having at the foundation of the characterization structure what will be referred to herein as "operational AI model representation" (the meaning of this term will be described further below). FIG. 4 illustrates that the characterization structure 400 includes multiple operational AI model representations 410 including operational AI model representations 411 through 414. However, the ellipsis 415 represents that the characterization structure 400 may include any number (and perhaps an enumerable number) of operational AI model representations.

The characterization structure 400 also includes refinement definition 420 for each of the operational AI model representations. The refinement definitions 420 thus includes refinement definition 421 associated with operational AI model representation 411, refinement definition 422 associated with operational AI model representation 412, refinement definition 423 associated with operational AI model representation 413, and refinement definition 424 associated with operational AI model representation 414. The ellipses 425 represents that there may be a refinement definition for each of the operational AI model representations 410.

AI model representations 411 through 414 are provided by way of example merely as a starting point for describing some of the breadth of the term "operational AI model representation". For instance, the operational AI model representation 411 is illustrated as identifying a single AI model type (in this case, AI model type 321 from FIG. 3). This means that the operational AI model representation is not a data/model combination, but merely an AI model expression. In this case, that AI model expression is an identification of an AI model type without reference to any input data set type. This means that regardless of the input data set that is applied to an AI model of the AI model type 321, the refinement definition 421 is associated with that AI model. An AI model expression may include an AI model type or multiples thereof, an AI model subtype or multiples there, and/or an AI model or multiples thereof. Thus, an AI model expression may very precisely and compactly define sets of any number of AI models.

On the other hand, the operational AI model representation 412 is illustrated as identifying a single input data set type (in this case, input data set type 312) from FIG. 3). This means that this operational AI model representation 412 is also not a data/model combination, but merely an input data set expression. In this case, that input data set expression is an identification of an input data set type without reference to any AI model expression. This means that regardless of the AI model to which an input data set of that input data set type 312 is applied, the refinement definition 422 is associated with that input data set. An input data set expression may include an input data set type or multiples thereof, an input data set subtype or multiples there, and/or an input data set or multiples thereof. Thus, an input data set expression may very precisely and compactly define sets of any number of input data sets.

The operational AI model representation 413 is represented by a data/model combination. Specifically, the AI model representation 413 includes a combination of the input data set type 313 and the AI model type 323. Recall that in FIG. 3, as represented by arrow 335, this is an operational data/model combination. This operational AI model representation 413 means that the refinement 423 is associated with the data/model combination that includes all combinations of an input data set of the input data set type 313 applied to an AI model of the AI model type 323.

The operational AI model representation 414 is also represented by a data/model combination. Specifically, the AI model representation 414 includes a combination of the input data set type 313 and the AI model type 324. Recall that in FIG. 3, as represented by arrow 336, this is an operational data/model combination. This operational AI model representation 414 means that the refinement 424 is associated with the data/model combination that includes all combinations of an input data set of the input data set type 313 applied to an AI model of the AI model type 324.

More generally speaking, an operational AI model representation may include a data/model combination in which the input data set(s) are defined by a particular input data set expression and in which the AI model(s) are defined by a particular AI model expression. In such a case, the associated refinement is applicable when an input data set that satisfies the input data set expression is applied to an AI model that satisfies the AI model expression. Thus, data/model combinations may be very precisely and compactly defined, even when there are a large number of input data sets and AI models. Furthermore, operational AI model representations 410 may be compactly and precisely defined.

Figure 5:
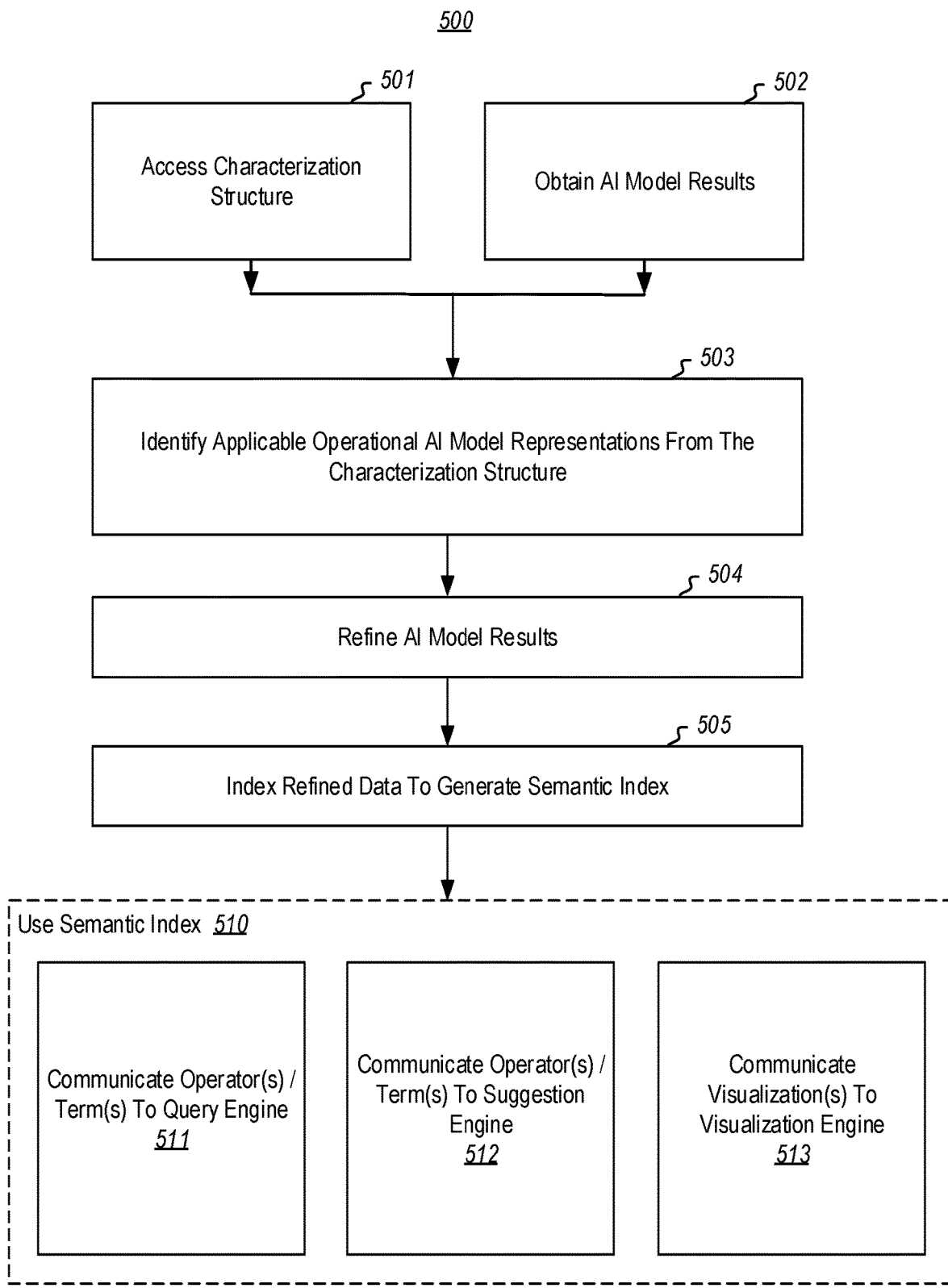
FIG. 5 illustrates a method for a computing system to exercise artificial intelligence in accordance with the principles described herein.

The description of FIG. 4 will continue now with frequent reference to FIG. 5. FIG. 5 illustrates a method 500 for a computing system to exercise artificial intelligence. The method 500 may be performed by the computing system 100 of FIG. 1, in the environment 300 of FIG. 3, using the characterization structure 400 of FIG. 4. The method 500 may be performed by the computing system 100 with the aid of a computer program product comprising one or more computer-readable storage media, on which there are executable instructions that are structured such that, when executed by the processor(s) 102 of the computing system 100, the computing system 100 is caused to perform the method 400.

The method 500 includes accessing at least a portion of an artificial intelligence (AI) model collection characterization structure that, for each of a plurality of AI models, represents a refinement of results of data applied to an AI model (act 501). For instance, the computing system may access at least portions of the characterization structure 400 of FIG. 4.

Figure 6:
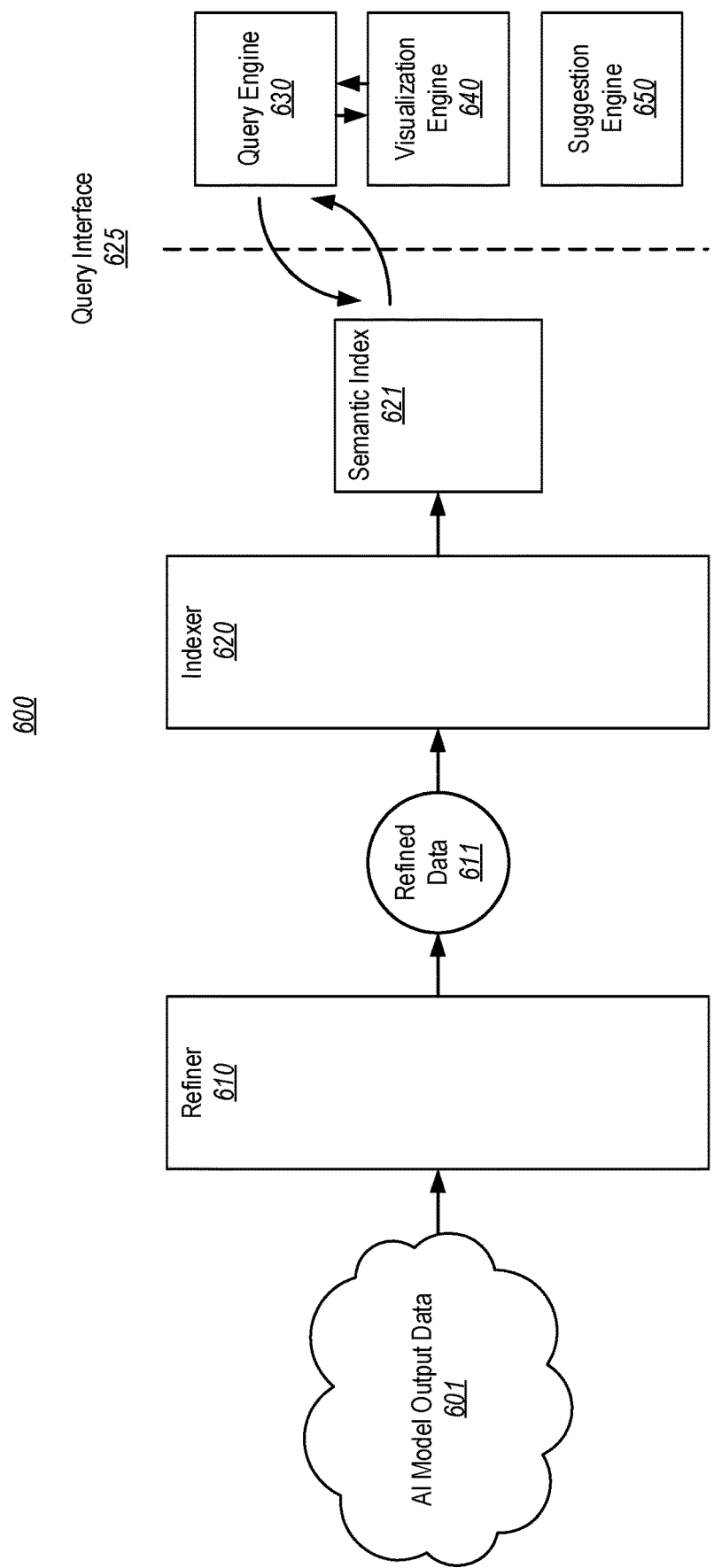
FIG. 6 illustrates a processing flow accomplished by performance of the method of FIG. 5.

Furthermore, the method 500 obtains results of input data set(s) applied to an AI model (act 502). FIG. 6 illustrates a processing flow 600 accomplished by performance of the method 500. The processing flow begins with the obtained results 601 from the AI model. These obtained results 601 are represented as a cloud as it is an example of the output data 211 of FIG. 2. Again, the obtained results 601 may be very difficult to interpret to extract desired information.

The accessing of the characterization structure (act 501) and the obtaining results from the AI model (act 502) are shown in parallel. This is not to represent that these acts must occur in parallel. To the contrary, this is done to represent that there need be no temporal ordering or relationship between when the acts 501 and 502 are performed. The accessing of the characterization structure (act 501) may occur before (perhaps well before) the results are obtained from an AI model (act 502), during the time when results are obtained from the AI model, after results are obtained from the AI model, or any or all of the above. Portions of the characterization structure may be accessed, cached, and processed when needed in order to accomplish method 500.

The method 500 then identifies the applicable operational AI model representation that applies to the output data (act 503). For instance, suppose that the output data 601 was generated (as shown in FIG. 2) by the application of the input data set 201 to the AI model 210. If the AI model 210 is of the AI model type 321, then the operational AI model representation 411 is applicable. If the input data set 201 is of the input data set type 312, then the operational AI model representation 412 is applicable. If the input data set 201 is of the input data set type 313 and the AI model 210 is of the AI model type 323, then the operational AI model representation 413 is applicable. IF the input data set 201 is of the input data set type 313 and the AI model 210 is of the AI model type 324, then the operational AI model representation 414 is applicable.

The obtained results are then refined based at least in part on the refinement represented in the characterization structure (act 504). The refinement may involve any process that is calculated to make the AI model output data more relevant. Since relevance may be specific to an input data set representation and/or an AI model representation (i.e., a given operational AI model representation), a different refinement may be expressed for each operational AI model representation. As an example only, refinement may involve removal, transformation, or prioritizing the raw output data. For instance, the refinement may involve filtering out some of the AI model output. The refinement may involve truncating, converting, combining, and/or otherwise transforming portions of the AI model output. The refinement may involve prioritizing portions of the output by perhaps ordering or ranking the output, tagging portions of the AI model output, and so forth.

The refinement may be performed in accordance with the applicable refinement definition. For instance, if the operation AI model representation 413 is applicable, then the associated refinement of the refinement definition 423 may be performed. However, that refinement may be modified in accordance with hints that are specific to an AI model. Those hints may be provided by the author of a particular AI model. In one embodiment, when an author creates an AI model, the AI model is associated with a wrapper in which refinement hints are provided, perhaps as specific as designating hints with respect to an input data set expression. The refinement may also be modified or augmented by machine learning analysis based on prior refinements of obtained result on an input data set applied to an AI model. This learned information may have application broadly, even globally, but may also be very granular, down to the user level, or even down to the per user and per situation level.

The refined data is contains much more relevant and refined information than the raw output data of the AI model. The refined data is then semantically indexed to generate a semantic index (act 505). In FIG. 6, an indexer 620 operates upon the refined data to generate a semantic index 621. This semantic index 621 is in the semantic space that a user can understand and reason with. Furthermore, because of the refinement process, the information represented within the semantic index is highly relevant. Furthermore, since the method 500 may be performed on a wide variety of input data set/AI model combinations, the method 500 may be repeated such that the user is given highly refined semantic access to the results of artificial intelligence, regardless of the number or available input data sets and AI models.

In any case, once the semantic index is created (act 505), the semantic index may be used (act 510). The number of ways in which a semantic index may be used is enormous, particularly if the semantic index is generated based on refined intelligence. As examples only, the semantic index may be used to causing at least a portion of the set of one or more operators/terms to be communicated to a query engine (act 511). The query engine may then enable these operators, and understand these terms, when the user issues a query against the query engine. In FIG. 6, for example, the query engine 630 may interface with the semantic index through the query interface 625. These operators and terms may also be included within the characterization structure 400 as operators/terms 430. For instance, the operational AI model representations 411 through 413 are associated with operator/term sets 431, 432 and 433, respectively. Thus, the characterization structure 400 may be used to quickly determine appropriate operations and terms to interface with the semantic index.

As another example, the semantic index may be used to cause at least a portion of the set of one or more operators/terms to be communicated a suggestions engine (act 512), which may then form relevant suggested queries to the user. In FIG. 6, for example, the suggestion engine 650 may receive the operators and terms and determine appropriate suggested queries to present to the user.

As yet another example, the semantic index may be used to determine an appropriate visualization for results of particular queries. These visualization(s) may also be included within the characterization structure 400 as visualizations 440. For instance, the operational AI model representations 412 through 414 are associated with visualization sets 442, 443 and 444, respectively. Thus, the characterization structure 400 may be used to quickly determine appropriate visualizations to use to present query results to a user.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
    one or more processors; and
    one or more computer-readable hardware storage devices storing computer-executable instructions that are executable by the one or more processors to cause the computing system to at least:
        obtain results of an input data set applied to an artificial intelligence (AI) model;
        access at least a portion of an AI characterization structure, the AI characterization structure comprising:
            a plurality of operational AI model representations, wherein an operational AI model representation is associated with a combination of an input data set type included in a plurality of input data set types and an AI model type included in a plurality of AI model types, the input data set type being a type of data identified for the input data set that was applied to the AI model, the AI model type being a type of model identified for the AI model such that a subsequently selected refinement definition is selected based on the combination of the input data set type and the AI model type that were identified for the input data set and the AI model, and
            a plurality of refinement definitions, each refinement definition being associated with at least one operational AI model representation included in the plurality of AI model representations;
        determine the input data set type of the input data set and the AI model type of the AI model;
        identify the operational AI model representation included in the plurality of operational AI model representations, wherein the one operational AI model representation is identified based on a determination that the one operational AI model representation is applicable to the obtained results based on a combination of the input data set type and the AI model type associated with the obtained results;
        select a refinement definition included in the plurality of refinement definitions based on the identified one operational AI model representation, which is identified as a result of the obtained results being associated with the combination of the input data set type and the AI model type; and
        use the selected refinement definition to refine the obtained results, wherein refining the obtained results using the selected refinement definition is further augmented by machine learning analysis to determine a granularity at which to refine the obtained results.

2. The computing system in accordance with claim 1, wherein execution of the computer-executable instructions further causes the computing system to at least:
    semantically index the refined results to generate a semantic index, the artificial intelligence (AI) characterization structure further comprising a set of one or more operators and/or terms that a query engine may use to query against the semantic index; and
    cause at least a portion of the set of one or more operators and/or terms to be communicated to the query engine.

3. The computing system in accordance with claim 1, wherein execution of computer-executable instructions further causes the computing system to at least:
    semantically index the refined results to generate a semantic index, the artificial intelligence (AI) characterization structure further comprising a set of one or more visualizations that a visualization engine may use to visualize to a user responses to queries against the semantic index; and
    cause at least a portion of the set of one or more visualizations to be communicated to the visualization engine.

4. A method for a computing system to exercise artificial intelligence (AI), the method comprising:
    obtaining results of an input data set applied to an artificial intelligence (AI) model;
    accessing at least a portion of an AI characterization structure, the AI characterization structure comprising:
        a plurality of operational AI model representations, wherein an operational AI model representation is associated with a combination of an input data set type included in a plurality of input data set types and an AI model type included in a plurality of AI model types, the input data set type being a type of data identified for the input data set that was applied to the AI model, the AI model type being a type of model identified for the AI model such that a subsequently selected refinement definition is selected based on the combination of the input data set type and the AI model type that were identified for the input data set and the AI model, and
        a plurality of refinement definitions, each refinement definition being associated with at least one operational AI model representation included in the plurality of AI model representations;
    determining the input data set type of the input data set and the AI model type of the AI model;
    identifying the operational AI model representation included in the plurality of operational AI model representations, wherein the one operational AI model representation is identified based on a determination that the one operational AI model representation is applicable to the obtained results based on a combination of the input data set type and the AI model type associated with the obtained results;
    selecting a refinement definition included in the plurality of refinement definitions based on the identified one operational AI model representation, which is identified as a result of the obtained results being associated with the combination of the input data set type and the AI model type; and using the selected refinement definition to refine the obtained results, wherein refining the obtained results using the selected refinement definition is further augmented by machine learning analysis to determine a granularity at which to refine the obtained results.

5. The method in accordance with claim 4, further comprising:
semantically indexing the refined results to generate a semantic index.

6. The method in accordance with claim 5, further comprising:
using the semantic index to present a suggested query to a user.

7. The method in accordance with claim 5, the artificial intelligence (AI) characterization structure further comprising a set of one or more operators that a query engine may use to query against the semantic index, the method further comprising:
causing at least a portion of the set of one or more operators to be communicated to the query engine.

8. The method in accordance with claim 5, the artificial intelligence (AI) characterization structure further comprising a set of one or more terms that a query engine may use to query against the semantic index, the method further comprising:
causing at least a portion of the set of one or more terms to be communicated to the query engine.

9. The method in accordance with claim 5, the artificial intelligence (AI) characterization structure further comprising a set of one or more visualizations that a visualization engine may use to visualize to a user responses to queries against the semantic index, the method further comprising:
causing at least a portion of the set of one or more visualizations to be communicated to the visualization engine.

10. The method in accordance with claim 4, the artificial intelligence (AI) characterization structure further representing, for each of a plurality of AI model and input data set type combinations, a refinement of results of data applied to an AI model, wherein the refining the obtained results is at least based on the refinement represented in the characterization structure for the combination of the AI model and the input data set.

11. The method in accordance with claim 4, the refining of the obtained results also based on hints specific to the AI model.

12. The method in accordance with claim 11, the hints specific to the AI model being within a model-specific data structure that is associated with the AI model.

13. The method in accordance with claim 4, the refining of the obtained results also based on machine learning analysis of prior refinements of obtained results of data applied to an AI model.

14. The method in accordance with claim 4, the refining of the obtained results also based on machine learning analysis of prior refinements of obtained results of the input data set applied to an AI model.

15. The method in accordance with claim 4, the refining of the obtained results also based on machine learning analysis of prior refinements of obtained results of data applied to an AI model when those obtained results are provided for a particular user, such that the refining is specific to the particular user.

16. The method in accordance with claim 4, the AI model comprising a machine learning model.

17. The method in accordance with claim 4, the obtained results being first obtained results, the input data set being first input data set of a first data set type, the obtained results being first obtained results, the method further comprising:
obtaining results of a second input set data of a second data set type applied to the AI model to obtain second obtained results; and
refining the second obtained results at least based on the refinement represented in the AI characterization structure for the AI model.

18. The method in accordance with claim 4, the obtained results being first obtained results, the input data set being first input data set of a first data set type, the refinement represented in the characterization structure for the AI model being a first refinement that is applicable for the AI model and input data set of the first data set type, the obtained results being first obtained results, the method further comprising:
obtaining results of a second input data set of a second data set type applied to the AI model to obtain second obtained results; and
refining the second obtained results at least based on a second refinement represented in the AI characterization structure for the AI model and input data set of the second data set type, the second refinement being different than the first refinement.

19. The method in accordance with claim 4, the AI model being a first AI model, the method further comprising:
obtaining results of a second input data set applied to a second AI model, the second AI model also being one of the plurality of AI models; and
refining the obtained results from the second AI model at least based on a refinement represented in an AI characterization structure for the second AI model.

20. A computer program product comprising one or more computer-readable storage media having thereon computer-executable instructions that are executable by one or more processors of a computing system to cause the computing system to exercise artificial intelligence (AI) by causing the computing system to at least:
obtain results of an input data set applied to an artificial intelligence (AI) model;
access at least a portion of an AI characterization structure, the AI characterization structure comprising:
a plurality of operational AI model representations, wherein an operational AI model representation is associated with a combination of an input data set type included in a plurality of input data set types and an AI model type included in a plurality of AI model types, the input data set type being a type of data identified for the input data set that was applied to the AI model, the AI model type being a type of model identified for the AI model such that a subsequently selected refinement definition is selected based on the combination of the input data set type and the AI model type that were identified for the input data set and the AI model, and
a plurality of refinement definitions, each refinement definition being associated with at least one operational AI model representation included in the plurality of AI model representations;
determine the input data set type of the input data set and the AI model type of the AI model;
identify the operational AI model representation included in the plurality of operational AI model representations, wherein the one operational AI model representation is identified based on a determination that the one operational AI model representation is applicable to the obtained results based on a combination of the input data set type and the AI model type associated with the obtained results;

select a refinement definition included in the plurality of refinement definitions based on the identified one operational AI model representation, which is identified as a result of the obtained results being associated with the combination of the input data set type and the AI model type; and use the selected refinement definition to refine the obtained results, wherein refining the obtained results using the selected refinement definition is further augmented by machine learning analysis to determine a granularity at which to refine the obtained results.

* * * * *